United States Patent [19]
Fischer et al.

[11] Patent Number: 5,160,164
[45] Date of Patent: Nov. 3, 1992

[54] GAS DEFLECTION DEVICE FOR AN AIR BAG ASSEMBLY

[75] Inventors: Kurt F. Fischer, Oxford; Samuel A. Awotwi, Auburn Hills, both of Mich.

[73] Assignee: TRW Vehicle Safety Systems Inc., Lyndhurst, Ohio

[21] Appl. No.: 710,557

[22] Filed: Jun. 5, 1991

[51] Int. Cl.$^5$ .............................................. B60R 21/20
[52] U.S. Cl. .................................... 280/743; 280/732
[58] Field of Search ............... 280/728, 730, 731, 732, 280/742, 743

[56] References Cited

U.S. PATENT DOCUMENTS

| | | | |
|---|---|---|---|
| 3,473,824 | 10/1969 | Carey et al. | 280/729 |
| 3,552,770 | 1/1971 | Berryman | 280/740 |
| 3,602,526 | 8/1971 | Brawn | 280/740 |
| 3,602,527 | 8/1971 | Goetz | 280/740 |
| 3,610,657 | 10/1971 | Cole | 280/740 |
| 3,770,387 | 11/1973 | Loomba | 422/166 |
| 3,791,671 | 2/1974 | Zens | 280/740 |
| 3,822,895 | 7/1974 | Ochiai | 280/737 |
| 3,901,530 | 8/1975 | Radke | 280/736 |
| 3,907,327 | 9/1975 | Pech | 280/743 |
| 3,938,824 | 2/1976 | Patzelt | 280/730 |
| 4,006,918 | 2/1977 | MacFarland | 280/729 |
| 4,013,305 | 3/1977 | Ichihara | 280/732 |
| 4,169,613 | 10/1979 | Barnett | 280/732 |
| 4,178,017 | 12/1979 | Ishi et al. | 280/740 |
| 4,265,468 | 5/1981 | Suszko et al. | 280/729 |
| 4,290,627 | 9/1981 | Cumming et al. | 280/729 |
| 4,360,223 | 11/1982 | Kirchoff | 280/742 |
| 4,830,401 | 5/1989 | Honda | 280/736 |
| 4,902,036 | 2/1990 | Zander et al. | 280/736 |
| 4,911,471 | 3/1990 | Hirabayashi | 280/732 |
| 5,018,762 | 5/1991 | Suzuki et al. | 280/731 |

*Primary Examiner*—Kenneth R. Rice
*Attorney, Agent, or Firm*—Calfee, Halter & Griswold

[57] ABSTRACT

A deflector is incorporated in a passenger-side air bag assembly which is adapted to be mounted in either the upper portion of a dashboard or the middle portion of a dashboard. The vehicle air bag assembly includes a container, a folded air bag disposed in the container, and an inflator disposed at least partially in the container. Prior to the deployment of the air bag assembly, the deflector is also disposed within the container. The inflator is adapted to discharge a gas flow which forces the air bag and the deflector through a portion of the container to form a deployment opening and which flows within the air bag through the deployment opening to inflate the air bag. The air bag is designed to be inflated to a predetermined geometric form for restraining a vehicle occupant who is pitched forward during a vehicle collision. This predetermined geometric form includes a torso-contact area which is disposed at a predicted location of the torso of the vehicle occupant while being pitched forward during a vehicle collision. The deflector is preferably made of the same material as the air bag and is disposed within the air bag when the air bag is inflated. When the air bag is inflated, the deflector defines at least part of a deflection channel which includes an upstream end communicating with the deployment opening inside the air bag and an open downstream end. The deflection channel is shaped to redirect the gas flow towards the torso-contact area of the air bag.

25 Claims, 3 Drawing Sheets

GAS DEFLECTION DEVICE FOR AN AIR BAG ASSEMBLY

FIELD OF THE INVENTION

This invention relates generally to a deflector for an air bag assembly. More specifically, the invention relates to a deflector which may be incorporated into an air bag assembly adapted to be mounted to either the upper portion of a vehicle dashboard or the middle portion of a vehicle dashboard. The deflector is designed to redirect the gas flow generated by an inflator towards the predicted location of the torso of an occupant who is being pitched forward in a collision.

BACKGROUND OF THE INVENTION

An air bag assembly may be incorporated into a vehicle to protect an occupant during a crash or collision. During a front end collision, a vehicle will be subjected to significant deceleration forces. If these deceleration forces are great enough, they may cause an unrestrained occupant to be pitched forward. An air bag assembly is adapted to restrain a vehicle occupant who is being pitched forward during a vehicle collision to prevent him from striking a structural part of the vehicle, such as the vehicle dashboard and/or windshield.

Typically, an air bag assembly includes: (i) a container; (ii) a folded air bag disposed in the container; and (iii) an inflator, or gas generator, disposed at least partially within the container. On the driver side of the vehicle, the air bag assembly will commonly be incorporated into the steering wheel to protect the driver of the vehicle. On the passenger side of the vehicle, the air bag assembly will commonly be incorporated into the dashboard. In either case, the air bag assembly is located proximate the passenger compartment of the vehicle, and in front of the predicted location of an occupant prior to a vehicle collision.

At the onset of a collision, the inflator is actuated to discharge a flow of relatively high pressure gas. The gas flow rapidly (i) forces the air bag through a portion of the container and into the passenger compartment, and (ii) flows into the air bag to inflate it in a predetermined inflation pattern. This predetermined inflation pattern will usually be such that an occupant's torso will initially contact the air bag as he is pitched forward during a vehicle collision. Thereafter, the occupant's head will contact the air bag. This specific sequence of contacts is important because the "initial-contact" portion of an occupant's body will be required to absorb a substantial amount of the restraining force exerted by the inflated air bag.

In designing an air bag assembly, and/or when installing such an assembly into a vehicle, two concerns must be addressed. First, the installed air bag assembly must be adapted so that the air bag, when inflated, will be disposed between potentially harmful structural parts of the vehicle and the predicted location of the occupant prior to a collision. Second, the air bag assembly must be adapted so the air bag has an inflation pattern such that it will initially contact an occupant's torso while he is being pitched forward in a vehicle collision.

As indicated above, a passenger side air bag assembly will commonly be incorporated into the dashboard on the passenger side of a vehicle. In this manner, when the air bag is inflated, it will be disposed between potentially harmful structural parts of the vehicle, i.e. the dashboard and the windshield, and the predicted location of the occupant prior to the collision. This mounting arrangement has been found to be the most convenient and acceptable in view of the automobile industry's preferred manufacturing techniques for passenger compartments.

On the passenger side of vehicles, the profile of the dashboard will vary from model to model. These differences in dashboard designs and other factors have resulted in passenger-side air bag assemblies being coupled to dashboards in a number of ways. One coupling arrangement, in which a passenger-side air bag assembly is coupled to an upper, or top, portion of the dashboard, is of particular interest. Also of particular interest is a coupling arrangement in which the air bag assembly is coupled to a middle, or rearward, portion of the dashboard.

When an air bag assembly is mounted to the upper portion of a dashboard, design factors will usually dictate that the gas flow must exit the container in an upward direction toward the windshield of the vehicle. This upward flow pattern will usually result in the gas flow being directed towards a location above the predicted location of an occupant's torso. More specifically, the gas flow will usually be directed towards, or above, the predicted location of an occupant's head. Consequently, the occupant's head will probably contact the air bag before the occupant's torso in a vehicle collision. Such an air bag inflation pattern is undesirable because the occupant's head will be of a lesser mass and a lighter weight than the occupant's torso and therefore will be less suitable for absorbing a substantial amount of the restraining force initially exerted by the inflated air bag. Thus, if a passenger-side air bag assembly is mounted to the upper portion of a dashboard, it will probably be necessary to control the inflation pattern of the air bag so that the occupant's head will not contact the air bag before the occupant's torso.

Additionally, in certain configurations of air bag assemblies which are adapted to be mounted to the middle portion of a dashboard, the gas flow will not necessarily exit the container in a direction towards the predicted location of a vehicle occupant's torso. Instead, in some configurations, the gas flow tends to be directed towards the occupant's head. This phenomenon has been found to exist, at least to a limited degree, even when the inflator and container appear to be aimed towards the predicted location of a vehicle occupant's torso. Consequently, if a passenger-side air bag assembly is mounted to the middle portion of a dashboard, it will probably be necessary to control the inflation pattern of the air bag so that the occupant's head will not contact the air bag before the occupant's torso.

Applicants therefore believe a need exists for a passenger-side air bag assembly which (i) may be mounted to either the upper portion of the dashboard or the middle portion of the dashboard, and (ii) may incorporate a single compartment air bag having an inflation pattern such that gas flow exiting the container will be redirected towards the predicted location of an occupant's torso.

SUMMARY OF THE INVENTION

The present invention provides a deflector device for an air bag assembly which is adapted to restrain an occupant of a vehicle in the event of a crash or collision. The deflector is particularly suited to be incorporated into a passenger-side air bag assembly which is adapted to be coupled to either an upper portion of a dashboard or a middle portion of a dashboard. When an air bag assembly is coupled to a vehicle dashboard in this manner, its orientation will may be such that the gas flow exiting the assembly's container will be in an angularly upward direction towards, or above, the predicted location of an occupant's head. Additionally, other factors in the design of an air bag assembly may cause the gas flow exiting the assembly's container to be directed in this angularly upward direction. The deflector controls the inflation pattern of the air bag so that the air bag will not undesirably contact an occupant's head before it contacts the occupant's torso.

More particularly, the deflector of the present invention is designed to redirect the gas flow exiting the container for an air bag assembly towards the predicted location of an occupant's torso. Unlike many rigid baffles and deflecting devices, the deflector of the present invention is designed to be disposed within the air bag when the air bag is inflated. Additionally, unlike tethers and multi-compartment air bags, the deflector actually redirects the gas flow rather than physically controlling the profile of the air bag.

According to the present invention, a vehicle air bag assembly comprises a container, a folded air bag disposed in the container, an inflator disposed at least partially in the container, and a deflector disposed within the container. The inflator is adapted to discharge a gas flow which forces the air bag and the deflector through a portion of the container to form a deployment opening and which flows within the air bag through the deployment opening to inflate the air bag. The air bag assembly may be mounted to an upper portion of the dashboard of a vehicle in such a manner that the gas flow through the deployment opening flows in an angularly upward direction. Alternatively, the air bag assembly may be mounted to a middle portion of the dashboard of vehicle.

The air bag is designed to be inflated to a predetermined geometric form for restraining a vehicle occupant who is pitched forward during a vehicle collision. This predetermined geometric form includes a torso-contact area which is disposed at a predicted location of the torso of a vehicle occupant while being pitched forward during a vehicle collision. Because a vehicle occupant may be a variety of sizes, the term "predicted location" in this context relates to a location covering a certain range of expected occupant sizes.

The deflector is designed to be disposed within the air bag when the air bag is inflated and is preferably made of the same material as the air bag. When the air bag is inflated, the deflector defines at least part of a deflection channel which includes an upstream end communicating with the deployment opening inside the air bag and an open downstream end. The deflection channel is shaped to redirect the gas flow towards the torso-contact area of the air bag.

In one embodiment of the invention, the deflector consists essentially of a curved panel. The deflection channel is defined partially by the deflector and partially by the air bag. More specifically, the air bag includes two opposite side portions, which are connected to opposite sides of the torso-contact area of the air bag. These side portions cooperate with the deflector to form the deflection channel when the air bag is inflated. Thus the air bag may be viewed as having a predetermined width when it is expanded and the deflection channel spans the width of the air bag.

In another embodiment of the invention, the deflector includes a first panel, a second panel and two end panels all of which are roughly rectangular in shape. The panels cooperate together to define the deflection channel in such a manner that the channel occupies an approximately cubical volume of space. The upstream and downstream ends of the channel are located on adjacent sides of this cubical shape so that the gas flow through the deployment opening is forced to turn approximately 90° as it travels through the channel and is redirected towards the torso-contact area of the air bag.

These and other features of the invention are fully described and particularly pointed out in the claims.

DETAILED DESCRIPTION

Figure 1:
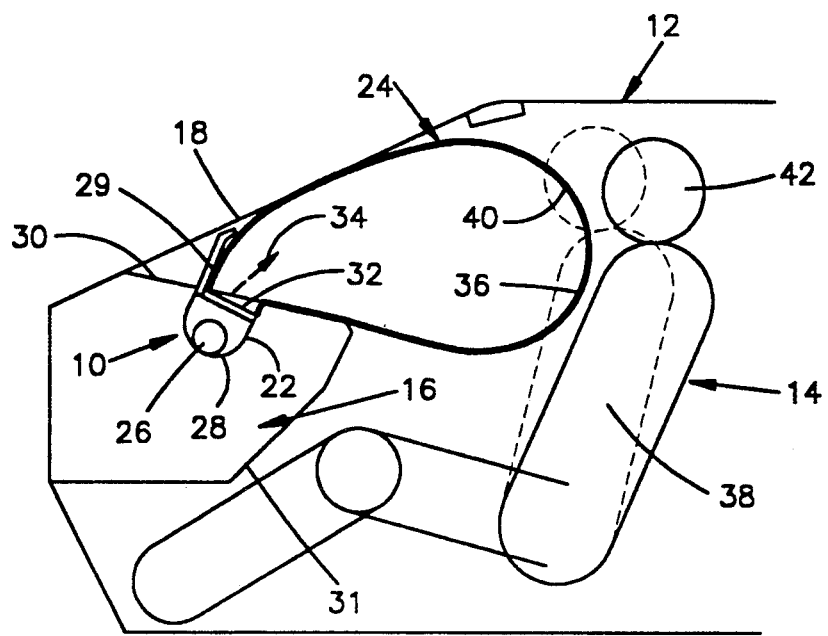
FIG. 1 is a side view of an almost, but not quite, fully inflated air bag assembly which is mounted in an upper portion of a dashboard, this FIG. schematically showing an air bag contacting a vehicle occupant during a collision.
Figure 2:
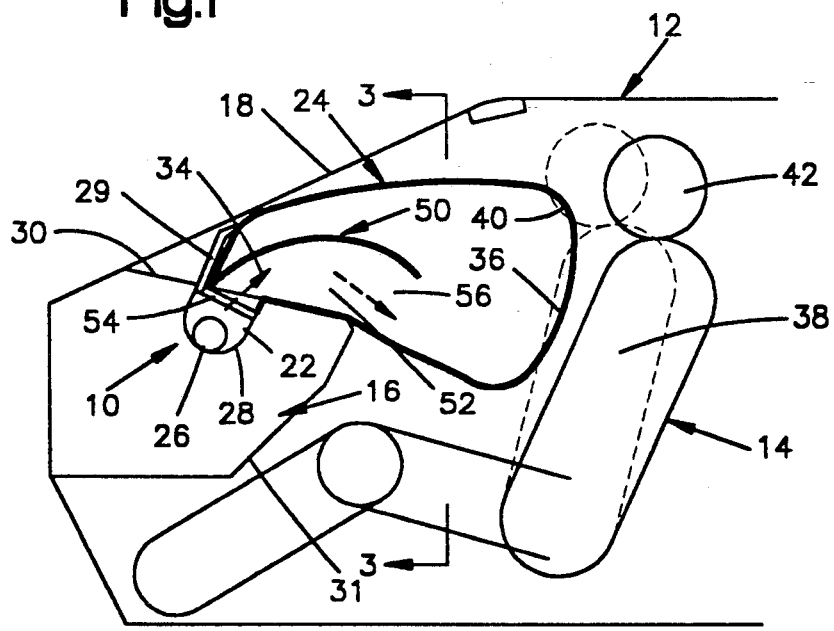
FIG. 2 is a side view of the air bag assembly of FIG. incorporating a deflector according to one embodiment of the present invention, this FIG. also schematically showing the air bag contacting a vehicle occupant during a collision.

Referring now to the drawings in detail, and initially to FIGS. 1 and 2, an air bag assembly 10 is illustrated in an almost, but not quite, fully inflated condition. The air bag assembly 10 is installed in a vehicle 12 in a manner so as to a protect an occupant 14 during a crash or collision. During a front end collision, the vehicle 12 will be subjected to significant deceleration forces which, if great enough, will cause the occupant 14 to be pitched forward. Unless the occupant 14 is restrained during the early stages of this forward pitching or movement, he will probably strike structural components of the vehicle 12, such as the dashboard 16 and/or the windshield 18. The predicted location of the occupant 14 prior to a collision is shown in solid lines in FIGS. 1 and 2 and the predicted location of the occupant 14 in the early stages of a collision is shown in broken lines. Because a vehicle occupant may be a variety of sizes, the term "predicted location" in this context relates to a location covering a certain range of expected occupant sizes.

The air bag assembly FIG. 10 includes a container 22, an air bag 24 and an inflator 26. Prior to deployment of the air bag assembly, the air bag 24 would be folded in a compact form and disposed within the container 22. The air bag 24 is preferably made of woven fabric but could be made of other materials, such as plastic film. The container 22 comprises a reaction can 28 and a cover 29 which may form part of the dashboard 16. Nonetheless, other container and cover arrangements are possible with, and contemplated by, the present invention. For example, the container 22 could comprise a reaction plate and a concave cover for storing the air bag 24.

The inflator 26 is preferably an elongated cylinder in shape and is disposed within the container 22 in such a manner that its axis is generally horizontal. The preferred form of the inflator 26 includes radially oriented nozzles (not shown) which point towards the cover 29. While the inflator 26 is shown completely disposed within the container 22, any arrangement in which the inflator 26 is at least partially disposed within the container 22 is within the scope of the present invention.

The air bag assembly FIG. 10 is designed for use on the passenger-side of the vehicle 12 and is coupled to the dashboard 16 of the vehicle, via the reaction can 28. The dashboard 16 includes an upper portion 30 extending at an acute angle to the windshield 18 and a middle portion 31 extending downwardly from the upper portion 30. In the embodiment illustrated in FIG. 1, the reaction can 28 is mounted in a cavity formed in the upper portion 30 of the dashboard 16.

At the onset of a collision, a chemical mixture (not specifically shown) in the inflator 26 is ignited to generate a flow of relatively high pressure gas. The gas flow begins to inflate the air bag 24 and rapidly forces the air bag 24 through a portion of the container 22 to form a deployment opening 32. In the illustrated embodiment, this portion of the container 22 is the cover 29 which is designed to pivot away from the reaction can 28 upon deployment of the air bag assembly 10.

The gas flow then continues to flow into and within the air bag, through the deployment opening 32, to inflate the air bag 24 in a predetermined inflation pattern. Because of the mounting of the air bag assembly 10 relative to the dashboard 16, the gas flow within the air bag exits the container 22, or flows through the deployment opening 32, in an upward direction toward the windshield 18 of the vehicle 12. This upward direction is shown schematically in FIGS. 1 and 2 by arrow 34.

The air bag 24, which is preferably of a single-compartment construction, is designed to be inflated to a predetermined geometric form. The predetermined geometric form may be viewed as including a torso-contact area 36, which corresponds to the predicted location of the torso 38 of the occupant 14, and a head-contact area 40, which corresponds to the predicted location of the head 42 of the occupant 14. As indicated above, a vehicle occupant may be a variety of sizes. Thus, the term "predicted location" in this context relates to a location covering a certain range of expected occupant sizes.

FIG. 1 illustrates the inflation pattern of the air bag assembly 10 when the inflation pattern of the air bag 24 is not controlled. As shown, the upward gas flow pattern (indicated by arrow 34) results in the gas flow being directed towards a location above the occupant's torso 38. In relation to the air bag 24, the gas flow would be directed towards a location above the torso-contact area 36 of the air bag. This gas flow pattern will result in the air bag 24 having an inflation pattern such that the occupant s head 42 will contact the air bag 24 before the occupant's torso 38 in a vehicle collision.

FIG. 2 illustrates the inflation pattern of the air bag assembly 10 when a deflector 50 according to one embodiment of the present invention is incorporated in the air bag 24. The deflector 50 consists essentially of a curved panel and is preferably made of the same material as the air bag 24. As shown, the deflector 50 is designed to be disposed within the air bag 24 when the air bag is inflated. When the air bag 24 is inflated, the deflector 50 defines at least part of a deflection channel 52 which includes an upstream end 54 communicating with the deployment opening 32 inside the air bag and an open downstream end 56. The deflection channel 52 is shaped to redirect the gas flow towards the torso-contact area 36 of the air bag 24. In this manner, the air bag 24 will have an inflation pattern such that the occupant's torso 38 will contact the air bag 24 before the occupant's head 42 in a vehicle collision.

Figure 3:
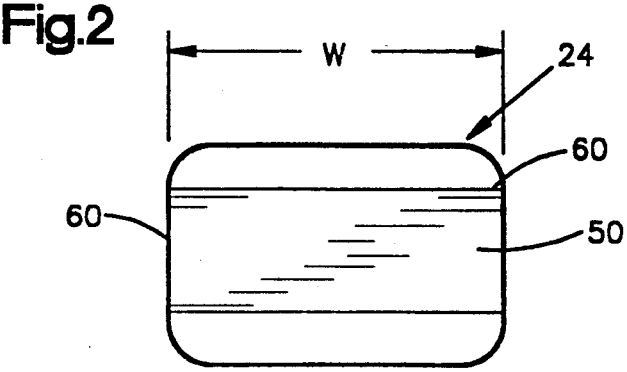
FIG. 3 is a view taken along line 3—3 in FIG. 2.

In the first embodiment of the present invention, the deflection channel 52 is defined partially by the air bag 24. (See FIGS. 2 and 3) More specifically, the air bag 24 includes two opposite side portions 60, connected to opposite sides of the torso-contact area 36. These side portions cooperate with the deflector 50 to form the deflection channel 42 when the air bag 24 is inflated. The air bag 26 thus has a certain width "W" when it is inflated, and the deflection channel 52 spans the width of the air bag 26.

Figure 4:
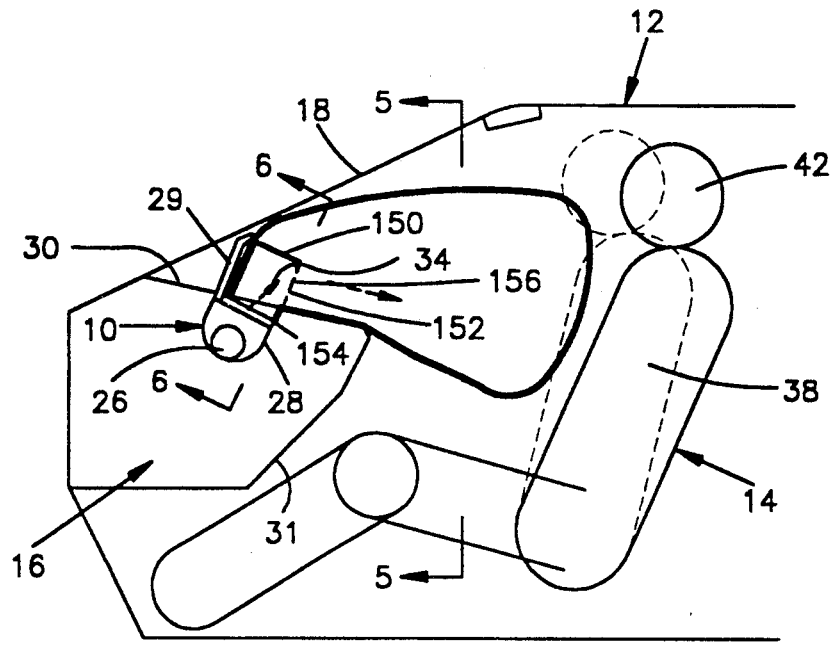
FIG. 4 is a side view of the air bag assembly of FIG. 1 incorporating a deflector according to another embodiment of the present invention, this FIG. also showing the air bag contact a vehicle occupant during a collision.

FIG. 4 illustrates the inflation pattern of the air bag assembly 10 when a deflector 150 according to another embodiment of the present invention is incorporated in the air bag 24. The deflector 150 is preferably made of the same material as the air bag 24 and is designed to be disposed within the air bag 24 when the air bag is inflated. When the air bag 24 is inflated, the deflector 150 defines a deflection channel 152 having an upstream end 154 communicating with the deployment opening 32 and an open downstream end 156.

Figure 5:
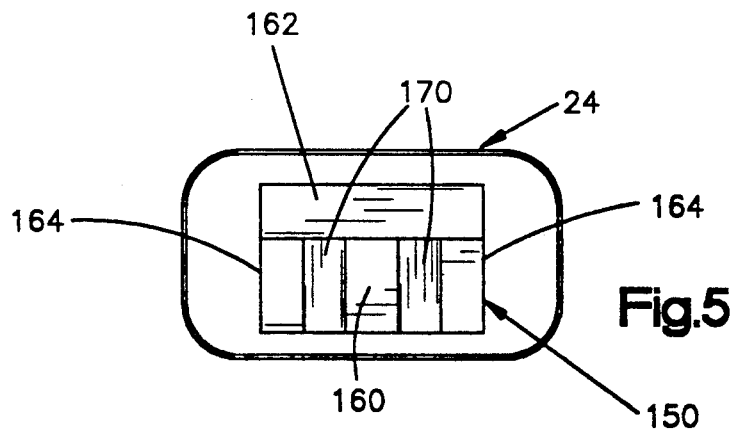
FIG. 5 is a view taken along line 5—5 in FIG. 4.
Figure 6:
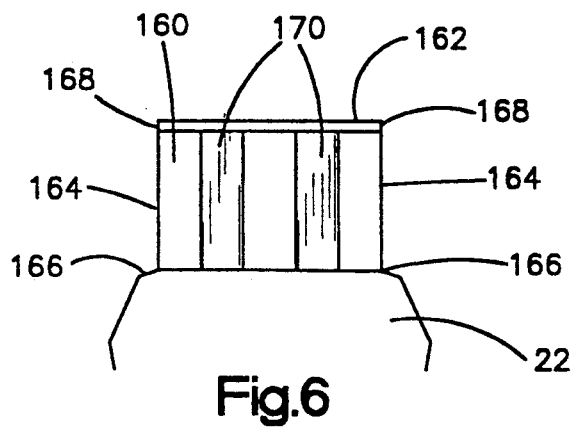
FIG. 6 is a view taken along line 6—6 in FIG. 4.

As is shown more clearly in FIGS. 5-6, the deflector 150 includes a first deflection panel 160, a second deflection panel 162, and two end panels 164. The panels are all roughly rectangular in shape and together cooperate to define the deflection channel 152 in manner such that the channel occupies an approximately cubical volume of space. The upstream and downstream ends 154 and 156 of the channel 152 are located on adjacent sides of this cubical shape so that the gas flow through the deployment opening 32 is forced to turn approximately 90° as it travels through the channel 152 and is redirected towards the torso-contact area 36 of the air bag 24.

The first deflection panel 160 partially defines the upstream end 154 of the deflection channel 152 and extends in a direction substantially perpendicular to the plane of the deployment opening 32 when the air bag 24 is inflated. The second deflection panel 162 extends perpendicularly from the first deflection panel 160 and partially defines the downstream end 156 of the deflection channel 152. Each of the opposite end panels includes a first edge 166 and a second edge 168 perpendicularly oriented relative to the first edge 166. The first edge 164 cooperates with the first deflection panel 160 to define the upstream end 154 of the deflection channel 152 when the air bag is inflated. The second edge 168 cooperates with the second deflection panel 162 to define the downstream end 156 of the deflection channel 152 when the air bag 24 is inflated. The deflector 150 further includes two spaced apart tethers 170 connecting the second deflection panel to the air bag 24. The tethers 170 are designed to extend across the downstream end 156 of the deflection channel 152 when the air bag 24 is inflated. While in the illustrated embodiment the reflector 150 includes two tethers 170, the use of one tether, or the use of more than two tethers, is possible and contemplated by the present invention.

Figure 7:
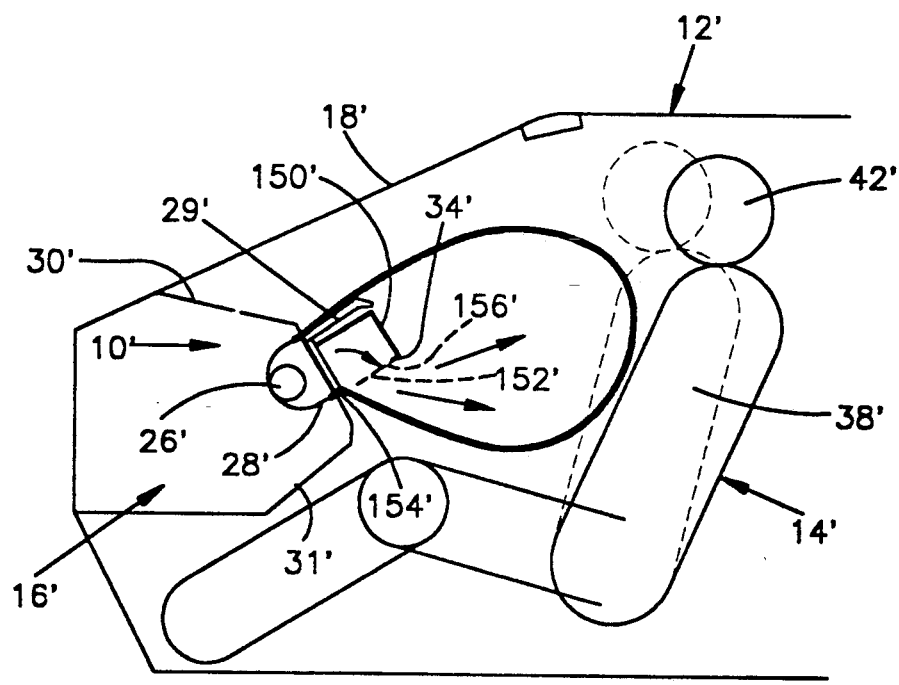
FIG. 7 is a view similar to FIG. 4, except that the air bag assembly is mounted in a middle portion of a dashboard.

FIG. 7 illustrates the inflation pattern of another air bag assembly 10' which incorporates a deflector 150' according to the present invention. Many of the components shown in this FIG. are essentially identical to those shown in FIG. 4, and thus like reference numerals are used to designate like parts with the components of FIG. 7 being followed by a prime (') suffix. The deflector 150' performs essentially in the same manner as the deflector 150, in that it redirects the gas towards the torso-contact area 36' of the air bag 24'. However, in this embodiment, the air bag assembly 10' is mounted in a cavity in the middle portion 31' of the dashboard 16', and the cover 29' is incorporated into the middle portion 31' of the dashboard 16'.

One may now appreciate that the present invention provides a deflector for an air bag assembly which is adapted to restrain an occupant of a vehicle in the event of a crash or collision. The deflector controls the inflation pattern of the air bag so that the air bag will not undesirably contact an occupant's head before it contacts the occupant's torso. Unlike many rigid baffles and deflecting devices, the deflector of the present invention is designed to be disposed within the air bag when the air bag is inflated. Additionally, unlike tethers and multi-compartment air bags, the deflector actually redirects the gas flow rather than controlling the profile of the air bag.

Although the invention has been shown and described with respect to certain preferred embodiments, it is obvious that equivalent alterations and modifications will occur to others skilled in the art upon the reading and understanding of this specification. The present invention includes all such equivalent alterations and modifications and is limited only by the scope of the following claims.

What is claimed is:

1. A vehicle air bag assembly comprising a container, a folded air bag disposed in said container, an inflator disposed at least partially in said container, and a deflector disposed within said container;
   said inflator being adapted to discharge a gas flow which forces said air bag and said deflector through a portion of said container to form a deployment opening to inflate said air bag;
   said air bag being designed to be inflated to a predetermined geometric form for restraining a vehicle occupant who is pitched forward during a vehicle collision, said predetermined geometric form including a torso-contact area which is disposed at a predicted location of the torso of said vehicle occupant while being pitched forward during a vehicle collision;
   said deflector being disposed within said air bag when said air bag is inflated and defining at least part of a deflection channel which includes an upstream end and an open downstream end, said deflection channel being shaped to redirect the gas flow towards said torso-contact area;
   said upstream end being partially defined by a portion of said deflector which extends from said deployment opening when said air bag is inflated.

2. A vehicle air bag assembly as set forth in claim 1 wherein said air bag is of a single-compartment construction.

3. A vehicle air bag assembly as set forth in claim 1 wherein said container includes a cover, said cover being the portion of said container in which said deployment opening is formed.

4. A vehicle air bag assembly as set forth in claim 1 wherein said deflector includes at least one tether connecting a portion of said deflector to said air bag, said tether being designed to extend across said open downstream end of said deflection channel when said air bag is inflated.

5. A vehicle air bag assembly as set forth in claim 1 wherein said deflection channel is defined partially by said air bag.

6. A vehicle air bag assembly as set forth in claim 5 wherein said air bag has a predetermined width when inflated and said deflector is connected to said air bag in such a manner that said deflection channel spans the width of said air bag when inflated.

7. A vehicle air bag assembly as set forth in claim 6 wherein said predetermined geometric form further includes two opposite side portions connected to opposite sides of said torso contact area, said opposite side portions and said deflector cooperating to form said deflection channel when said air bag is inflated.

8. An air bag assembly as set forth in claim 1 wherein said inflator:
   is an elongated cylinder in shape;
   is disposed within said container in such a manner that its axis is generally horizontal; and
   includes radially oriented nozzles which point towards said cover.

9. A vehicle air bag assembly as set forth in claim 1 wherein said deflector is made of the same material as said air bag.

10. A vehicle air bag assembly comprising a container, a folded air bag disposed in said container, an inflator disposed at least partially in said container, and a deflector disposed within said container;
    said inflator being adapted to discharge a gas flow which forces said air bag and aid deflector through a portion of said container to form a deployment opening and which flows within said air bag through said deployment opening to inflate said air bag;
    said air bag being designed to be inflated to a predetermined geometric form for retraining a vehicle occupant who is pitched forward during a vehicle collision, said predetermined geometric form including a torso-contact area which is disposed at a predicted location of the torso of aid vehicle occupant while being pitched forward during a vehicle collision;
    said deflector being disposed within said air bag when said air bag is inflated and defining at least part of a deflection channel which includes an upstream end and an open downstream end, said deflection channel being shaped to redirect the gas flow towards said torso-contact area;
    said deflector including a first deflection panel designed to define partially said downstream end of said deflection channel and to extend in a direction substantially perpendicular to the plane of said deployment opening when said air bag is inflated.

11. A vehicle air bag assembly as set forth in claim 10 wherein said deflector further includes a second planar deflection panel designed to extend perpendicularly from said first deflection panel when said air bag is inflated.

12. A vehicle air bag assembly as set forth in claim 11 wherein said deflector includes opposite end panels, each of said end panels having a first edge cooperating with said first deflection panel to define said upstream end of said deflection channel and a second edge cooperating with said second deflection panel to define said downstream end of said deflection channel.

13. A vehicle air bag assembly as set forth in either claim 11 or claim 12 wherein said deflector includes at least one tether connecting said second deflection panel to said air bag, said tether being designed to extend across said downstream end of said deflection channel when said air bag is inflated.

14. A vehicle air bag assembly as set forth in claim 13 wherein said deflector includes at least two spaced apart tethers connecting said second deflection panel to said air bag, said tethers being designed to extend across said downstream end of said deflection channel.

15. A vehicle air bag assembly as set forth in claim 13 wherein said first deflection panel, said second deflection panel, said end panels, and said tether are made of the same material as said air bag.

16. In combination, a vehicle and an air bag assembly;
said vehicle including a windshield and a dashboard which has an upper portion extending at an acute angle to said windshield and a middle portion extending downwardly from said upper portion;
said air bag assembly being coupled to said dashboard on the passenger-side of said vehicle;
said air bag assembly comprising a container, a folded air bag disposed in said container, an inflator disposed at least partially in said container, and a deflector disposed within said container;
said container including a cover incorporated into said dashboard;
said inflator being adapted to discharge a gas flow which forces said air bag and said deflector through a portion of said cover to form a deployment opening and which flows within said air bag through said deployment opening to inflate said air bag;
said air bag assembly being arranged relative to said vehicle such that the gas flow through said deployment opening flows in an angularly upward direction;
said air bag being designed to be inflated to a predetermined geometric form for restraining a vehicle occupant who is pitched forward during a vehicle collision, said predetermined geometric form including a torso-contact area which is disposed at a predicted location of the torso of said vehicle occupant while being pitched forward during a vehicle collision;
said deflector being disposed within said air bag when said air bag is inflated and defining at least part of a deflection channel within said air bag, said deflection channel being shaped to redirect the gas flow towards said torso-contact area.

17. A combination as set forth in claim 16 wherein said air bag is of a single-compartment construction.

18. A combination as set forth in claim 16 wherein said deflection channel is partially defined by said air bag.

19. A combination as set forth in claim 16 wherein said air bag has a predetermined width when inflated and said deflector is connected to said air bag in such a manner that said deflection channel spans the width of said air bag when inflated.

20. A combination as set forth in claim 16 wherein said deflector includes at least one tether connecting a portion of said deflector to said air bag.

21. A combination as set forth in claim 16 wherein said air bag assembly is coupled to said upper portion of said dashboard and wherein said cover is incorporated into said upper portion of said dashboard.

22. A combination as set forth in claim 16 wherein said air bag assembly is coupled to said middle portion of said dashboard and wherein said cover is incorporated into said middle portion of said dashboard.

23. A combination as set forth in claim 16 wherein said deflection channel includes an upstream end and an open downstream end and wherein said upstream end is partially defined by a portion of said deflector which extends from said deployment opening when said air bag is inflated.

24. A combination as set forth in claim 16 wherein said inflator:
is an elongated cylinder in shape;
is disposed within said container in such a manner that its axis is generally horizontal; and
includes radially oriented nozzles which point towards said cover.

25. A vehicle air bag assembly comprising a container, a folded air bag disposed in said container, an inflator disposed at least partially in said container, and a deflector disposed within sid container;
said inflator being adapted to discharge a gas flow which forces said air bag and said deflector through a portion of said container to form a deployment opening and which flows within said air bag through said deployment opening to inflate said air bag;
said air bag being designed to be inflated to a predetermined geometric form for restraining a vehicle occupant who is pitched forward during a vehicle collision, said predetermined geometric form including a torso-contact area which is disposed at a predicted location of the torso of said vehicle occupant while being pitched forward during a vehicle collision;
said defector being disposed within said air bag when said air bag is inflated and defining at least part of a deflection channel which includes an upstream end and an open downstream end, said deflection channel being shaped to redirect the gas flow towards said torso-contact area;
said deflection channel being defined partially by said air bag;
said deflector consisting essentially of a curved deflection panel.

* * * * *